(12) United States Patent
Unrau et al.

(10) Patent No.: US 7,975,018 B2
(45) Date of Patent: Jul. 5, 2011

(54) SYSTEMS AND METHODS FOR PROVIDING DISTRIBUTED CACHE COHERENCE

(75) Inventors: Ron Unrau, Edmonton (CA); Steven Bromling, Edmonton (CA); Wayne Karpoff, Sherwood Park (CA)

(73) Assignee: EMC Corporation, Hopkinton, MA (US)

( * ) Notice: Subject to any disclaimer, the term of this patent is extended or adjusted under 35 U.S.C. 154(b) by 619 days.

(21) Appl. No.: 11/177,924

(22) Filed: Jul. 7, 2005

(65) Prior Publication Data

US 2006/0031450 A1   Feb. 9, 2006

Related U.S. Application Data

(60) Provisional application No. 60/586,364, filed on Jul. 7, 2004.

(51) Int. Cl.
*G06F 15/167* (2006.01)
*G06F 13/00* (2006.01)
*G06F 13/28* (2006.01)

(52) U.S. Cl. ........ 709/214; 709/213; 709/215; 709/216; 711/130; 711/141; 711/147

(58) Field of Classification Search .................. 711/131, 711/145, 209, 141, 147; 709/214, 215, 216, 709/223, 250, 213, 217; 710/317; 714/9
See application file for complete search history.

(56) References Cited

U.S. PATENT DOCUMENTS

| | | | | |
|---|---|---|---|---|
| 5,197,146 A | * | 3/1993 | LaFetra | 711/144 |
| 5,410,697 A | * | 4/1995 | Baird et al. | 711/152 |
| 5,577,204 A | * | 11/1996 | Brewer et al. | 710/317 |
| 5,611,070 A | * | 3/1997 | Heidelberger et al. | 711/133 |
| 5,630,097 A | | 5/1997 | Orbits et al. | |
| 5,727,150 A | * | 3/1998 | Laudon et al. | 709/215 |
| 5,832,534 A | * | 11/1998 | Singh et al. | 711/141 |
| 5,835,957 A | * | 11/1998 | Lin | 711/169 |
| 5,875,456 A | * | 2/1999 | Stallmo et al. | 711/114 |
| 5,900,015 A | * | 5/1999 | Herger et al. | 711/141 |
| 6,044,438 A | * | 3/2000 | Olnowich | 711/130 |
| 6,049,851 A | * | 4/2000 | Bryg et al. | 711/141 |
| 6,081,833 A | | 6/2000 | Okamoto et al. | |
| 6,112,286 A | | 8/2000 | Schimmel et al. | |
| 6,148,414 A | * | 11/2000 | Brown et al. | 714/9 |
| 6,170,044 B1 | | 1/2001 | McLaughlin et al. | |
| 6,192,408 B1 | | 2/2001 | Vahalia et al. | |
| 6,247,144 B1 | | 6/2001 | Macias-Garza et al. | |
| 6,263,402 B1 | * | 7/2001 | Ronstrom et al. | 711/131 |
| 6,275,953 B1 | | 8/2001 | Vahalia et al. | |
| 6,286,090 B1 | | 9/2001 | Steely, Jr. et al. | |

(Continued)

FOREIGN PATENT DOCUMENTS

EP   0871128 A2   10/1998

(Continued)

*Primary Examiner* — Philip J Chea
*Assistant Examiner* — Tae K Kim
(74) *Attorney, Agent, or Firm* — BainwoodHuang

(57) ABSTRACT

A plurality of access nodes sharing access to data on a storage network implement a directory based cache ownership scheme. One node, designated as a global coordinator, maintains a directory (e.g., table or other data structure) storing information about I/O operations by the access nodes. The other nodes send requests to the global coordinator when an I/O operation is to be performed on identified data. Ownership of that data in the directory is given to the first requesting node. Ownership may transfer to another node if the directory entry is unused or quiescent. The distributed directory-based cache coherency allows for reducing bandwidth requirements between geographically separated access nodes by allowing localized (cached) access to remote data.

22 Claims, 5 Drawing Sheets

U.S. PATENT DOCUMENTS

| | | | |
|---|---|---|---|
| 6,295,584 B1* | 9/2001 | DeSota et al. | 711/147 |
| 6,356,983 B1* | 3/2002 | Parks | 711/145 |
| 6,490,661 B1* | 12/2002 | Keller et al. | 711/150 |
| 6,631,449 B1* | 10/2003 | Borrill | 711/141 |
| 6,681,239 B1 | 1/2004 | Munroe et al. | |
| 6,760,756 B1* | 7/2004 | Davis et al. | 709/215 |
| 6,766,360 B1* | 7/2004 | Conway et al. | 709/214 |
| 6,813,522 B1 | 11/2004 | Schwarm et al. | |
| 6,816,891 B1 | 11/2004 | Vahalia et al. | |
| 6,857,059 B2* | 2/2005 | Karpoff et al. | 711/209 |
| 6,912,668 B1* | 6/2005 | Brown et al. | 714/6 |
| 6,920,485 B2* | 7/2005 | Russell | 709/214 |
| 6,961,825 B2* | 11/2005 | Steely, Jr. et al. | 711/141 |
| 7,010,554 B2 | 3/2006 | Jiang et al. | |
| 7,136,969 B1 | 11/2006 | Niver et al. | |
| 7,194,532 B2* | 3/2007 | Sazawa et al. | 709/223 |
| 7,240,165 B2* | 7/2007 | Tierney et al. | 711/144 |
| 7,266,706 B2* | 9/2007 | Brown et al. | 714/6 |
| 7,373,466 B1* | 5/2008 | Conway | 711/156 |
| 7,395,374 B2* | 7/2008 | Tierney et al. | 711/141 |
| 7,475,207 B2 | 1/2009 | Bromling et al. | |
| 7,478,202 B1 | 1/2009 | Niver et al. | |
| 2001/0037406 A1* | 11/2001 | Philbrick et al. | 709/250 |
| 2001/0049773 A1* | 12/2001 | Bhavsar | 711/147 |
| 2002/0013889 A1 | 1/2002 | Schuster et al. | |
| 2002/0059499 A1* | 5/2002 | Hudson | 711/118 |
| 2002/0138698 A1* | 9/2002 | Kalla | 711/130 |
| 2002/0166031 A1* | 11/2002 | Chen et al. | 711/141 |
| 2003/0018739 A1* | 1/2003 | Cypher et al. | 709/213 |
| 2003/0023702 A1* | 1/2003 | Kokku et al. | 709/216 |
| 2003/0105829 A1* | 6/2003 | Hayward | 709/214 |
| 2003/0167420 A1 | 9/2003 | Parsons | |
| 2003/0233423 A1* | 12/2003 | Dilley et al. | 709/214 |
| 2004/0019891 A1* | 1/2004 | Koenen | 718/102 |
| 2004/0044744 A1* | 3/2004 | Grosner et al. | 709/217 |
| 2004/0260768 A1* | 12/2004 | Mizuno | 709/203 |
| 2005/0160230 A1* | 7/2005 | Doren et al. | 711/141 |
| 2005/0160232 A1* | 7/2005 | Tierney et al. | 711/141 |

FOREIGN PATENT DOCUMENTS

WO    WO 98/28685 A1    7/1998

* cited by examiner

SYSTEMS AND METHODS FOR PROVIDING DISTRIBUTED CACHE COHERENCE

CROSS-REFERENCES TO RELATED APPLICATIONS

This application claims the benefit of U.S. provisional application No. 60/586,364, filed Jul. 7, 2004, which is hereby incorporated by reference in its entirety.

BACKGROUND OF THE INVENTION

The present invention relates generally to sharing data across one or more data storage access nodes on a data storage network, and more particularly to systems and method for providing directory-based cache coherency across a distributed network of data storage access nodes.

In current storage networks, and in particular storage networks including geographically remote access nodes and storage resources, preserving or reducing bandwidth between resources and access nodes is highly desirable. It is therefore also desirable that data access be localized, in part to improve access speed to pages requested by host devices. Caching pages at access nodes provides localization, however, the cached data must be kept coherent with respect to modifications at other access nodes that may be caching the same data. Current storage network access solutions, however, do not provide viable coherency mechanisms for caching pages locally at storage network access nodes.

Accordingly, it is desirable to provide efficient data localization and cache coherency systems and methods that overcome the above and other problems. Such systems and methods should also provide reduced bandwidth usage, or messaging requirements, between storage network access nodes.

BRIEF SUMMARY OF THE INVENTION

The present invention provides systems and methods for implementing directory-based cache coherency across a distributed network of data storage access nodes.

According to the present invention, a plurality of access nodes sharing access to data on a storage network implement a directory based cache ownership scheme. One node, designated as a global coordinator, maintains a directory (e.g., table or other data structure) storing information about I/O operations by the access nodes. The other nodes send requests to the global coordinator when an I/O operation is to be performed on identified data. Ownership of that data in the directory is given to the first requesting node. Ownership may transfer to another node if the directory entry is unused or quiescent. According to the present invention, the distributed directory-based cache coherency allows for reducing bandwidth requirements between geographically separated access nodes by allowing localized (cached) access to remote data.

According to one aspect of the present invention, a method is provided for reducing the number messages sent between data access nodes sharing access to a data storage network so as to maintain traffic scalability. The method typically includes maintaining a directory of page ownership entries, wherein ownership of an entry is initially granted to the first access node requesting access to a page in the entry, and wherein ownership of an entry automatically transfers to the node that is accessing pages in the entry more often so as to reduce the number of synchronization messages sent between nodes.

According to another aspect of the present invention, a method is provided for reducing bandwidth between geographically separated access nodes sharing access to data in a data storage network. The method typically includes caching data locally to an access node to provide localized cache access to that data for that node, and maintaining data coherency for cached data between the access nodes using a directory based ownership scheme.

According to yet another aspect of the present invention, a method of providing cache coherence between caches in a distributed set of data access nodes in a data storage network typically includes maintaining a directory in at least one of a plurality of access nodes sharing access to the data storage network, the directory storing information about data accessed by the plurality of access nodes, and receiving, at a first data access node, a data access request from a host system, the data access request identifying data to be processed. The method also typically includes determining whether the first access node has the identified data stored in cache, and if not, determining, using the directory, whether another node in the plurality of access nodes has a copy of the identified data stored in cache, and if a node has a copy of the identified data stored in cache, sending one of a share request to that node to share the identified data so that the requesting node does not have to access the identified data from storage or an invalidate request to invalidate the copy of the data stored in that node's cache.

According to a further aspect of the present invention, a method is provided for reducing the a number messages sent between data access nodes sharing access to a data storage network so as to maintain traffic scalability. The method typically includes maintaining a directory for storing information about data accessed by a plurality of data access nodes, where the directory including entries representing one or more pages of data in the data storage network, and receiving, at a first data access node, a data access request from a host system, where the data access request identifying data to be processed. The method also typically includes determining, using a global directory coordinator, whether a node has ownership of the directory entry for the identified data, and if no node has ownership of the directory entry, granting to the first access node ownership of the directory entry for the identified data, and if a node has ownership of the entry, identifying that node to the first node. The first node can then communicate with the identified node to process an I/O request.

According to yet a further aspect, a system is provided for maintaining cache coherency between a plurality of data access nodes sharing access to a data storage network. The system typically includes a storage system for storing data, and a plurality of access nodes configured to access data in the storage system in response to host requests. One of the nodes is typically configured to maintain a directory (directory node) for storing information about data accessed by the plurality of data access nodes, where the directory includes entries representing one or more pages of data in the data storage network. In operation, upon receiving a data access request identifying data to be processed from a host, a first access node sends a request to the directory node, wherein the directory node determines whether a node has ownership of the directory entry for the identified data; and if no node has ownership of the directory entry, the directory node grants to the first access node ownership of the directory entry for the identified data, and if a node has ownership of the entry, the directory node identifies that node to the first access node.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

DETAILED DESCRIPTION OF THE INVENTION

According to one embodiment, a Directory Manager module, or DMG, is provided. The DMG is responsible for providing cache coherence mechanisms for shared data across a distributed set of data access nodes. The set of nodes that are caching data from a shared data volume are called a share group. In general, a DMG module includes software executing on a processor or other intelligence module (e.g., ASIC) in a node. A DMG module can be implemented in a single node or distributed across multiple intercommunicating nodes. In certain aspects, an access node is embodied as a controller device, or blade, communicably coupled to a storage network, such as a storage area network (SAN), that allows access to data stored on the storage network. However, it will be appreciated that an access node can also be embodied as an intelligent fabric switch or other network device such as a hub adapter Because Locality Conscious Directory Migration (LCDM) is applicable to databases, any networked compute node can be configured to operate as an access node with DMG functionality (e.g., a DMG can be run on a desktop computer with a network connection). U.S. Pat. No. 6,148,414, which is incorporated by reference in its entirety, discloses controller devices and nodes for which implementation of aspects of the present invention are particularly useful.

Figure 1:
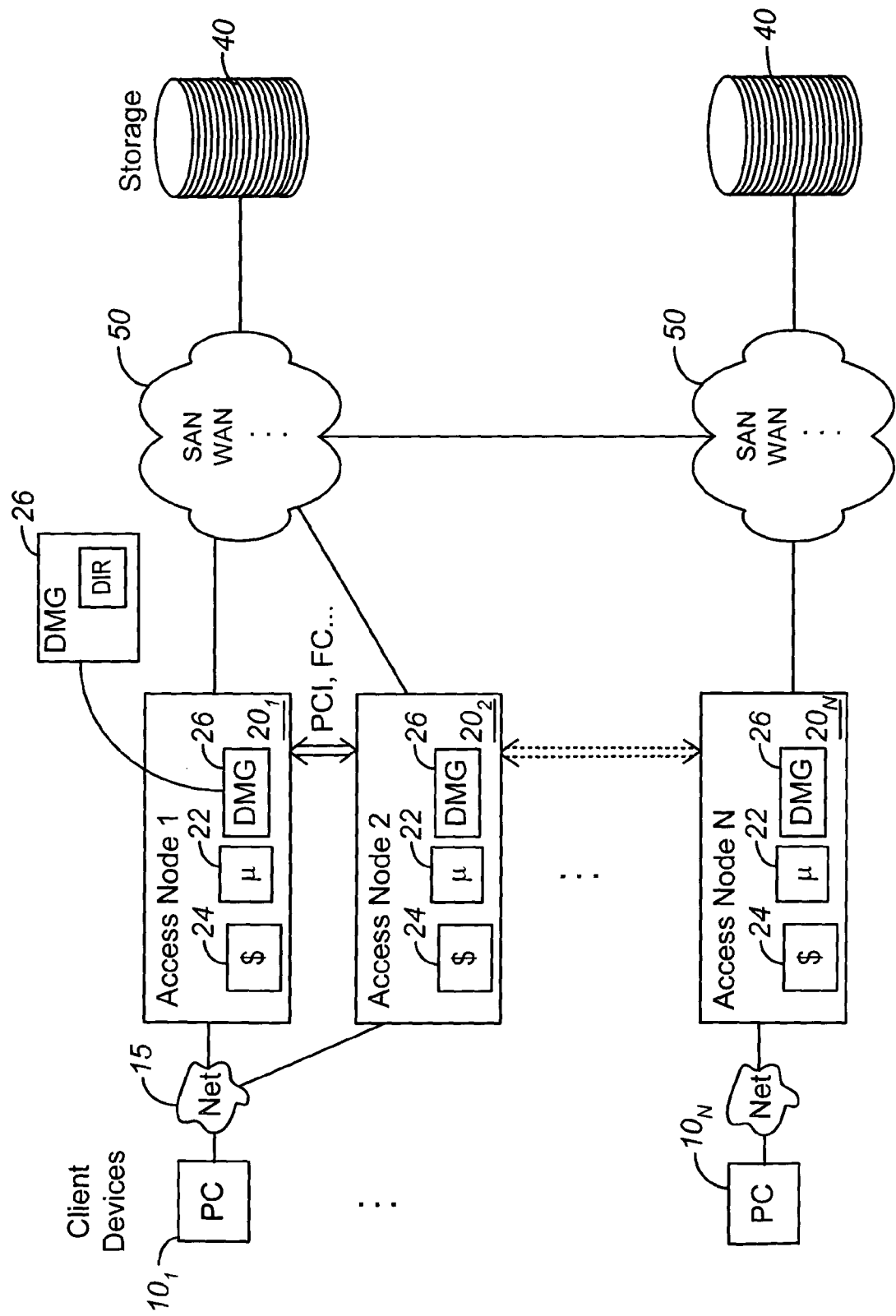
FIG. 1 shows an example of a basic network configuration according to the present invention.

FIG. 1 shows a basic network configuration according to the present invention. As shown, a plurality of network clients $10_1$ to $10_N$ are communicably coupled with a plurality of access node devices $20_1$ to $20_N$ (access nodes), each of which includes a processor component 22 such as a microprocessor or other intelligence module, a cache 24 (e.g., RAM cache) and/or other local storage, communication ports (not shown) and an instance of a DMG module 26. (In general, "N" is used herein to indicate an indefinite plurality, so that the number "N" when referred to one component does not necessarily equal the number "N" of a different component. For example, the number of clients 10 does not, but may, equal the number of access nodes 20 in FIG. 1.) Each client 10 is preferably communicably coupled to one or more of nodes 20 over a local network connection 15, however, clients may be communicably coupled with nodes 20 over any of a number of connection schemes as required for the specific application and geographical location relative to a node 20, including, for example, a direct wired or wireless connection, an Internet connection, any local area network (LAN) type connection, any metropolitan area network (MAN) connection, any wide area network (WAN) type connection, a VLAN, any proprietary network connection, etc. Each node 20 also typically includes, or is communicably coupled with, one or more AMFs, and is communicably coupled with one or multiple storage resources 40, each including one or more disk drives, over an network 50, such as a storage area network (SAN), LAN, WAN, MAN, etc. It is preferred that a node 20 be coupled to one or more storage resources over a local network connection. Nodes 20 may be located in close physical proximity to each other or one or more may be remotely located, e.g., geographically remote, from other nodes. Access nodes 20 are also able to intercommunicate with other nodes over network 50 and/or over other communication networks or mediums such as over a PCI bus or backbone or a Fibre channel network, or over network 15.

According to the present invention, distributed cache coherence is important for reducing bandwidth requirements between geographically separated access nodes by allowing localized (cached) access to remote data. According to one aspect, data access cannot be localized unless the data can be cached, yet it is unsafe to cache the data unless it can be kept coherent with respect to modifications at remote access nodes. Although any embodiment of the DMG can satisfy the correctness requirements of cache coherence, the high overhead of many implementations can outweigh the benefits of localized cache access. The LCDM embodiment of the present invention discussed below has demonstrated low enough overhead to make localized cache access practical and beneficial.

The base coherence unit in the DMG is a page (a logical block of storage), but the DMG allows for operations at both the sub-page and the multi-page levels. The directory is a collection of directory entries, each encoding distributed sharing knowledge for a specific page. When concurrent cache operations are active on a page, the directory entry locks and synchronizes access to the distributed resource. Directory information is kept current through point-to-point messages sent between the affected nodes. The DMG cache coherence messaging dialog allows it to share pages from remote caches (e.g., when read requests miss in the local cache) and invalidate remote cached copies (e.g., when write requests supercede previous copies).

Embodiments of a directory placement scheme and ways to take advantage of data access locality are described below in section 1.1. Section 1.2 introduces a messaging dialog and goes on, in Section 1.3, to demonstrate how locking is utilized at the directory to manage concurrent page accesses according to one embodiment. Lastly, Section 1.4 describes how location-aware page sharing is used to improve performance for geographically distributed cache coherence according to one embodiment.

1.1 Directory Placement

According to one aspect, in order to coordinate cache coherence, the DMG maintains a directory with entries tracking information about every active page. Active pages are those that can be found in at least one cache in the associated share group. The directory entry tracks which nodes have copies of the associated page, maintains a distributed lock to protect concurrent accesses to the page, and maintains a queue to serialize operations while the nodes wait for the lock.

1.1.1 Dedicated Directory Server

According to one embodiment, a very simple directory placement scheme is used in which the entire directory is situated on the first node that joins a share group. Such a directory scheme, however, may not scale well with the share group size. In general, there are two competing interests involved in determining the performance of a directory placement scheme. DMG operations on a node containing the directory entry for a given page can be optimized to avoid unnecessary message sends, thereby preserving inter-node bandwidth and improving operation latency. However, the directory node for a page has to process all the relevant message traffic from other nodes in the share group.

1.1.2 Striped Directory Placement

According to another embodiment, directory entries are striped in a round-robin fashion across the nodes in each share group. Because the DMG often has to deal with multi-page operations, the stripe size should be made sufficiently large to avoid frequent splitting of operations. Such striping is easy to implement and has minimal performance overhead, but two problems may make it desirable to seek a better solution. Those two problems are as follows:

1. Striping only performs well when all of the nodes in a share group are actively sharing pages distributed throughout the data volume. If any nodes are inactive, or if nodes are only sharing pages whose directory entries are on remote nodes, the performance may suffer. There is no way for a striped directory placement to adapt to a given workload.
2. Because striping is implemented, in one aspect, using a modulus function across nodes, if a node enters or leaves the share group, there is no quick and easy way to redistribute directory entries. Invalidating all caches and starting the directories from scratch is one option.

1.1.3 Locality Conscious Directory Migration

According to one embodiment of the present invention, the DMG implements a Locality Conscious Directory Migration, or LCDM, adaptive directory placement scheme. As in the striped directory placement embodiment, in the LCDM embodiment, directory entries are split up into chunks of multiple pages. However, the placement, or ownership, of those chunks is not preset or permanent. Instead, ownership of the directory chunks migrate to the node that is using those pages the most frequently. In addition to taking advantage of data access locality for improved I/O performance, LCDM advantageously helps in quickly recovering from node failure (or nodes being added to the share group), since there is no need to redistribute directory chunks. In one embodiment, directory chunk ownership is granted to the first node that accesses a page in the chunk.

Figure 2:
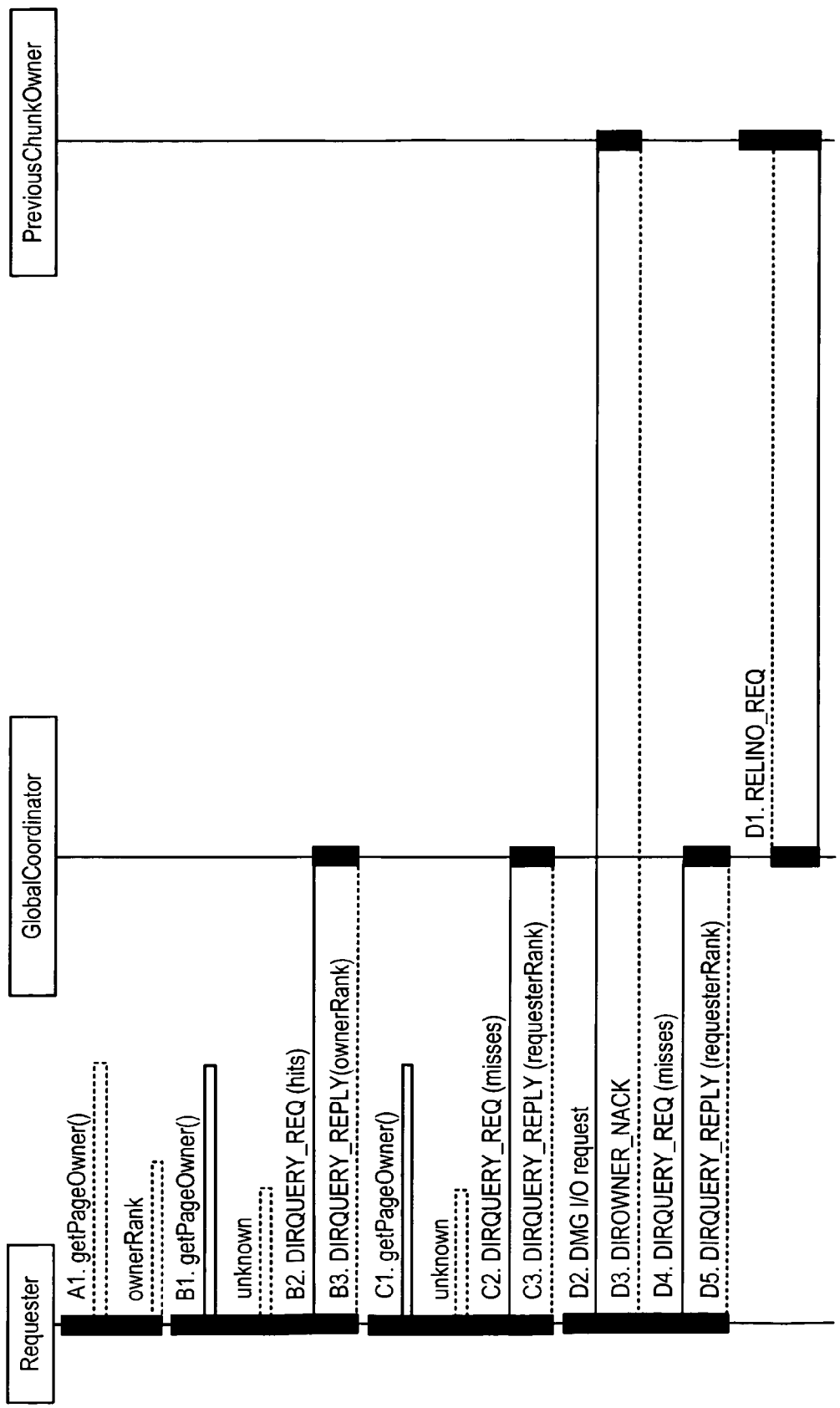
FIG. 2 shows examples of the scenarios relevant to directory ownership changes.

In one embodiment, ownership changes hands only when a directory chunk is empty, after all of the nodes have evicted every page in the chunk from their caches. One node in the share group is designated as the global directory chunk coordinator ("global coordinator"). This node grants ownership of a directory entry, and stores a look-up table, or other similar data structure, identifying ownership of each active page in the share group. The other nodes in the share group maintain local partial mirrors of the look-up table, but occasionally need to defer to the global coordinator. A global coordinator may itself also be or become an owner of a directory entry. FIG. 2 summarizes the scenarios relevant to directory ownership changes, which are explored in more detail below.

A. When the local node already knows who the owner of a directory chunk is, a simple table lookup to identify or confirm the owner before an I/O operation is performed.
B. If the local node is accessing a directory chunk for the first time, it sends a DIRQUERY_REQ message to the global coordinator node. If another node has already claimed ownership of the chunk, the coordinator responds to the requester with a DIRQUERY_REPLY message containing the rank of the chunk's owner. The requester then communicates with the access node owning the chunk to complete the I/O operation(s).
C. If, in the previous scenario, the global coordinator's look-up indicates that no node owns the directory chunk in question, it responds to the requester with a DIRQUERY_REPLY message containing the requester's rank and granting ownership. The rank is an index identifying the order in which the node joined the share group. An entry in the global coordinator's look-up table is made, and synchronized with other nodes.
D. When a chunk owner no longer has any directory entries, it sends a relinquish ownership, RELINQ_REQ, message to the global coordinator. If new requests arrive at the original chunk owner after a DMG node has relinquished chunk ownership, the original chunk owner responds with a DIROWNER_NACK message to the requester.

This will cause the requester to re-query the global coordinator. The first node to query the global coordinator after the relinquishment will be granted ownership of the chunk.

In another embodiment, LCDM is enhanced by allowing ownership of directory chunks to migrate between nodes even when they are not empty. This allows for more closely following I/O access patterns and improves the performance of the DMG by minimizing messaging requirements. However, this optimization generally has certain requirements as follows:

1. Directory chunk ownership can only be moved safely when the entire chunk is quiescent. If there is any active coherence traffic or locked pages, the move is not feasible.
2. Moving non-empty chunks involves shipping the sharing information to the new chunk owner. This must be done semi-atomically, so that new coherence requests are not started in the middle of the move.
3. Because the cost of transferring chunk ownership is not nil, the heuristic used to determine when to effect a transfer is very important, especially where there may be limited prior knowledge of cache workload.
4. Coordinating a directory chunk transfer can involve up to three nodes: the current chunk owner, the global coordinator and the new chunk owner. This may make the task of semi-atomically transferring more difficult.

1.2 Standard I/O Paths in the DMG

According to one embodiment, a message dialog is provided in the DMG for data access requests, e.g., read, write and update requests. Sequence dialogs are used (see FIGS. 3-5) to detail the message ordering. In each Figure, a variety of scenarios are explored to explain the range of conditions that must be dealt with at the DMG. These Figures differentiate between the node containing the client cache, the node owning the appropriate directory entry (directory node), and all other nodes that have a copy of the page or pages in question. It is important to note that in many cases, these entities coexist on the same node. Each role-sharing combination introduces new optimizations, and is handled as follows:

Single Member Share Group: In a single member share group, the directory exists only implicitly, as there is no ownership information for it to track. Requests from the client cache are trivial to handle, and can be answered immediately.

Client Cache and Directory Coexist: When the directory is local to the node making a DMG request, it removes the need for two message sends: the request at the start and the reply at the end.

Directory and Page Owner Coexist: When the directory node is also a page owner, it can handle share or invalidate requests locally, avoiding the need for extra messages.

1.2.1 DMG Reads

Figure 3:
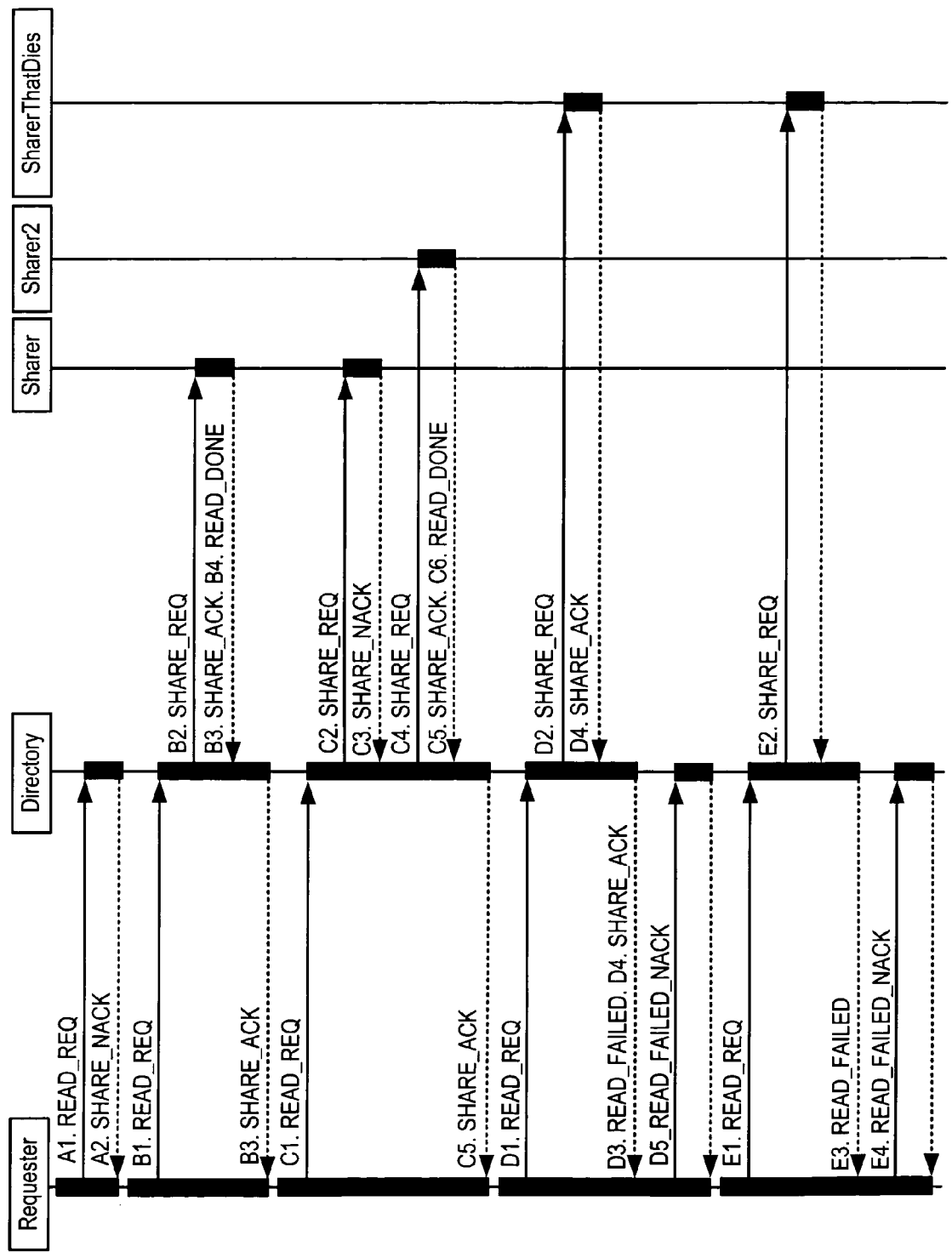
FIG. 3 shows an example of a variety of message sequences that are observed when a read misses in the cache and comes down to the DMG in an attempt to share a page from another node.

FIG. 3 details an example of the variety of message sequences that are observed when a read misses in the cache and comes down to the DMG in an attempt to share a page from another node. The following points provide a detailed description of each of the scenarios in FIG. 2.

A. When the directory does not contain an entry for the requested page, the directory node creates a new entry, marks the requester as the only page owner, and replies with a SHARE_NACK message. This causes the requester to go to an AMF ("Array Management Function") to get a copy of the page data from disk. In general, and as described in more detail in U.S. Pat. No. 6,148,414, an AMF provides access to storage resources, e.g., disks, for associated host systems. For example, when a host requests an AMF to perform an operation on a resource, the AMF synchronizes with any other AMFs sharing control of the redundancy group that includes the resource to be operated on, so as to obtain a lock on the resource. The AMF is typically resident at the same node as the cache for which a miss occurred, however, a remote AMF may be used.

B. If the directory look-up finds a remote copy of the page, the DMG sends a SHARE_REQ message to that node storing a cached copy ("sharer"). The sharer sends the requested page in a SHARE_ACK message directly to the client node, bypassing the directory node. When the sharer receives confirmation from the communication layer that the data has been sent, it sends a READ_DONE message to the directory node, allowing any waiting operations to commence.

C. If, in the previous scenario, the SHARE_REQ message arrives at the sharer after it has asynchronously evicted the page (see Section 1.2.4 below), the sharer replies to the directory node with a SHARE_NACK message. If there is another potential sharer, the directory node sends out a subsequent SHARE_REQ message and continues normally. Otherwise, if no other node has the page, the directory node replies to the requester with a SHARE_NACK message.

D. If the sharer dies after sending its SHARE_ACK message to the requester but before being able to send the READ_DONE message to the directory node, the directory node makes the assumption that the requester did not get the data. The directory node then sends a READ_FAILED message to the requester, indicating that the read may have failed. If the read was successful, the requester responds to the directory node with a READ_FAILED_NACK message. In the case of failure, the directory node needs to know whether the requester received the data or not, so that it can correctly handle further read requests as it finishes bringing the system to a quiescent state before commencing recovery.

E. In the previous example, if the sharer dies before it is able to send the SHARE_ACK message to the requester, the requester responds to the DMG's eventual READ_FAILED message with a READ_FAILED_ACK message.

1.2.2 DMG Writes

Figure 4:
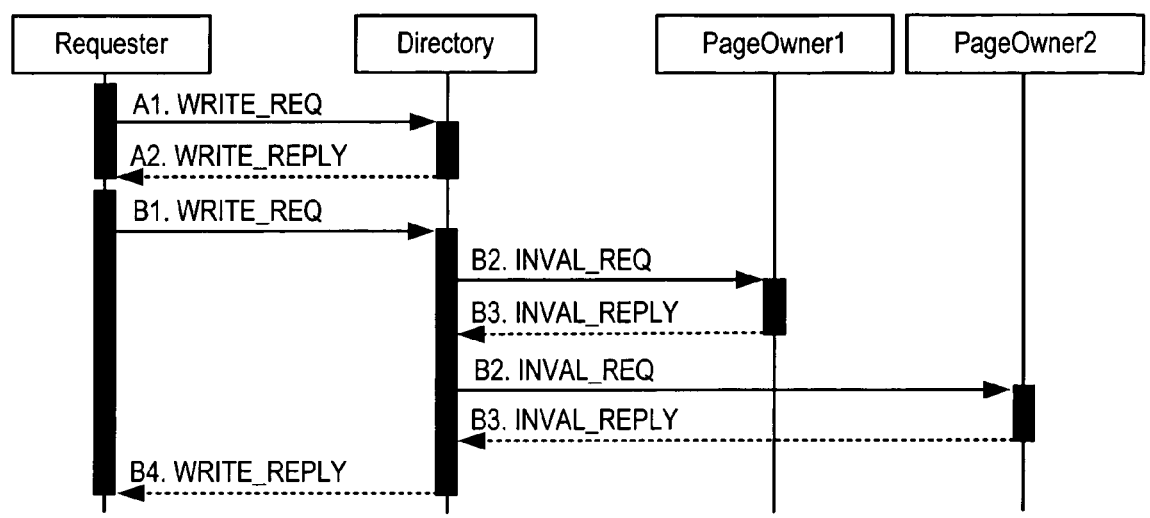
FIG. 4 shows an example of message sequences when a write request comes down to the DMG from a requesting node.

The message sequences when a write request comes down to the DMG from a requesting node are shown in FIG. 4 and described below.

A. If the directory does not contain an entry for the requested page, or finds an entry that indicates that the requester is the sole owner of the page, the directory node responds to the requester immediately with a WRITE_REPLY message. Upon receipt of the reply, the requester's cache is allowed to commit the newly written data to cache as soon as it is ready.

B. If the directory entry for the page in question shows that other nodes have copies of the page in their caches, the directory node sends out INVAL_REQ messages to each of them. Once all of the INVAL_REPLY messages have come back to the directory node, it replies as above to the requester.

1.2.3 DMG Updates

Figure 5:
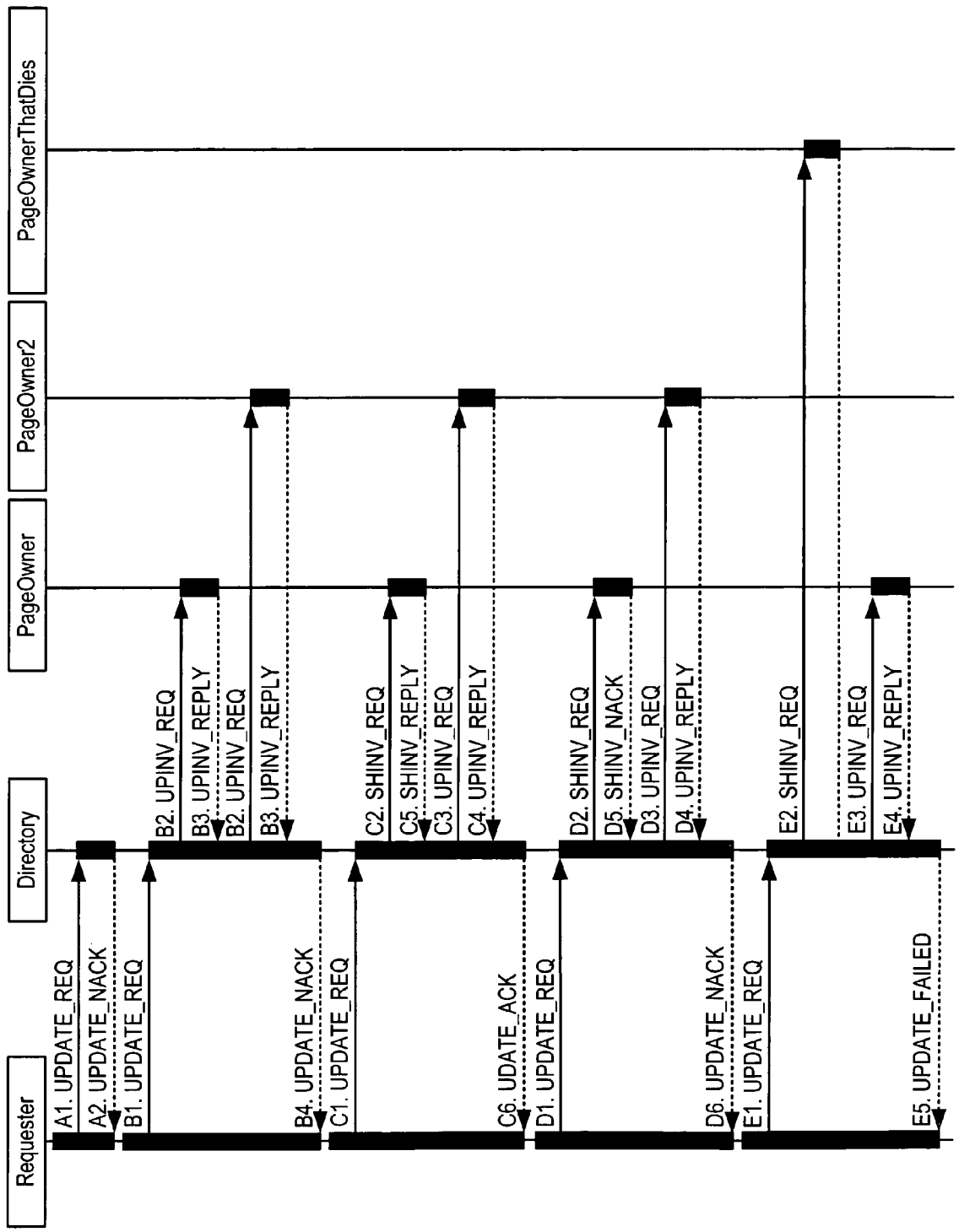
FIG. 5 shows examples of the message sequences for update requests.

As with reads, a number of messaging scenarios are possible in the DMG in response to an update (i.e., a sub-page write) request. FIG. 5 shows examples of the message sequences for update requests, which are also described in more detail below.

A. When an UPDATE_REQ message arrives at the directory node, an UPDATE_NACK message is returned immediately if either there is no directory entry for the page, or the requester is the sole owner of the page. The UPDATE_NACK message is always the directory's response when the requester already has a copy of the page or there is no copy of the page on any node. In the case where no nodes have a cached copy of the page, the requester reads the page data from an AMF. Once the requester's cache has completed its sub-page write, the requester responds to the DMG with an UPDATE_DONE message.

B. If the directory entry indicates that in addition to the requester owning a copy of the page, there is at least one other node with the page in cache, the directory node sends out UPINV_REQ messages to each of the other page owners. Once each of these nodes has invalidated their copy of the page and responded to the directory node with a UPINV_REPLY message, the directory node will continue by sending a UPDATE_NACK message to the requester as above.

C. If the requester does not have a copy of the page in its cache and the directory entry indicates that at least one other node has a copy of the page, the directory node sends a SHINV_REQ message to the node that last wrote the page and an UPINV_REQ message to the other nodes that hold a copy. The node to which the SHINV_REQ message is sent shares its copy of the page by forwarding it to the directory node in a SHINV_REPLY message, and then invalidates the local copy once the send is successfully complete. Once all of the replies have been received by the directory, the directory node sends an UPDATE_ACK message to the requester with the data from the share-invalidate target node.

D. If, in the previous scenario, the share-invalidate target node has synchronously evicted its copy of the page before receiving the SHINV_REQ message from the directory node, the target node responds with a SHINV_NACK message. Because the directory node will have already sent out invalidation requests to all other nodes with a copy of the page, at this point there will be no cached copies of the page. The directory node has no option but to respond to the requester with an UPDATE_NACK message (after waiting for all of the invalidation replies to come in), causing the requester to read the page from an AMF. This is fine because the node that evicted its copy of the page would have first needed to flush its copy out to an AMF—the directory always keeps track of the last writer to ensure data integrity.

E. If, after sending a SHINV_REQ message, the directory node notices that the share-invalidate target of that message has died, the directory node waits for the invalidation replies from other nodes and then fails the request by sending an UPDATE_FAILED message to the requester.

1.2.4 DMG Evictions

According to one aspect, to avoid unnecessary message latency, when a node cache evicts a page it simply sends out an asynchronous EVICT_REQ message to the DMG to notify it of the eviction. Because the notification is asynchronous, the cache may receive requests for the page after evicting it, but they are handled by the I/O message scenarios detailed above.

1.3 DMG Locking

One of the DMG's responsibilities is to prevent multiple concurrent changes to page data. The DMG allows multiple readers to access a page at the same time. Multiple writers, however, are serialized in the order in which the write requests arrived at the directory node, e.g., placed in a FIFO queue or buffer. According to one aspect, the caches on the nodes of the system may also require some serialization or locking to reserve and manipulate page frames. Because the nodes may need to hold both cache and DMG locks for the same pages at the same time, the system preferably includes a deadlock handling mechanism. According to one embodiment, the cache locks are made subordinate to the DMG locks, which means a locally held cache lock for a given page must be released if a DMG operation on that page is received.

When a read request arrives at the directory node, if the directory entry indicates that there are no operations waiting for the page and zero or more readers currently active, the read is allowed to proceed immediately. In contrast, when a write or update request arrives at the directory node, it can only proceed if there is no activity whatsoever on the page. In any other situation, new requests to the directory are queued up in the directory entry until they are activated by the completion of a preceding operation. For multi-page operations, the DMG gathers all of the locks for an operation in increasing order before replying to the client node and allowing the associated operation to proceed. If the DMG were to ignore these constraints and respond out-of-order to the client node for segments of a multi-page operation, a deadlock could occur.

According to one aspect, one optimization in the DMG to avoid wasted effort in the face of multiple concurrent writes to the same page involves checking the lock wait queue before allowing a write to proceed. If the write at the head of the queue is immediately followed by one or more writes from any node, the DMG can preemptively invalidate the earlier writes and allow the last write to proceed immediately. Since concurrent writes are not expected to be a common case, the implementation of this optimization is not crucial.

1.4 Location Awareness

According to one embodiment, the DMG optimizes its page sharing strategy based on the physical or logical proximity of nodes within a share group. In one aspect, the site id of each node is recorded by all of the nodes in each share group. When the directory node receives a read request, it looks first to see if any node within the same site (or close physical proximity) as the reader has the page. If so, it sends a share request to the nearest node. In another aspect, as a second option, sharing is done by the directory node itself (assuming it has the page in cache), to save the share request message send. If the directory node doesn't have the requested page cached, then any other node can be selected. In this case, no consideration is given to the relative distance between sites (i.e., nodes are either near or far in relation to each other). This same algorithm also applies to page sharing in an update situation.

It should be appreciated that code including instructions for implementing aspects of the DMG, including LCDM, can be stored on a computer readable medium such as a CD, DVD, ROM, RAM or the like, or can be transmitted over a network connection to and from data access node devices.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of providing cache coherence between caches in a distributed set of caching data access nodes sharing access to shared data of a data storage volume, the method comprising:

maintaining at least a portion of a directory in a first one of the access nodes, said directory storing locations of copies of the shared data among respective caches of the plurality of access nodes;

receiving, at the first access node, a data access request from a host system, said data access request identifying data of the shared data to be processed, determining whether the first access node has the identified data stored in its cache, and if not:
  (a) determining, using the portion of the directory, whether another node in the plurality of access nodes has a copy of the identified data stored in its cache;
  (b) if another node does not have a copy of the identified data in its cache, then satisfying the data access request by obtaining the data from a storage device on which the shared data of the data storage volume is stored; and
  (c) if another node has a copy of the identified data stored in its cache, then sending one of a share request to that node to share the identified data so that the requesting node does not have to access the identified data from storage or an invalidate request to invalidate the copy of the data stored in that node's cache, wherein the one of a share request or the invalidate request is used to provide cache coherence between the caches;

and if the first access node has the identified data stored in its cache, then (d) satisfying the data access request using the identified data in the cache of the first access node, and (e) if the data access is a read request, then refraining from sending the share request to any of the other access nodes having a copy of the identified data as indicated by the portion of the directory, wherein the directory is divided into chunks associated with corresponding sets of pages of the shared memory, and the portion of the directory in the first access node includes a chunk having a directory entry storing the locations of copies of the identified data among the caches of the access nodes, and further including participating in locality-conscious directory migration by which the chunks of the directory are dynamically distributed among the access nodes, the participating including:

prior to the satisfying of the data access request, obtaining ownership of the chunk so as to enable the first access node to use the portion of the directory to determine whether another of the access nodes has a copy of the identified data, the obtaining including:
(i) sending a directory query message to one of the access nodes functioning as a global directory chunk coordinator responsible for tracking and granting ownership of the chunks of the directory, the directory query message identifying the chunk;
(ii) receiving a directory reply message from the global directory chunk coordinator identifying a current owner of the chunk; and
(iii) communicating with the identified current owner of the chunk to obtain the ownership of the chunk; and
after the satisfying of the data access request, transferring ownership of the chunk to another of the access nodes.

2. The method of claim 1, wherein the data access request is a data read request, and wherein if none of the access nodes has a copy of the identified data stored in cache, the method further comprises:
creating a new entry in the directory identifying the requesting node as an owner of the identified data.

3. The method of claim 1, wherein the data access request is a write request, and wherein if none of the access nodes has a copy of the identified data stored in cache, the method further comprises:
committing written data to the requesting node's cache.

4. The method of claim 1, wherein the data access request is a write request, and wherein if one or more other nodes has a copy of the identified data stored in cache, the method further comprises:
sending an invalidate request to the other nodes that have a copy of the identified data stored in cache.

5. The method of claim 1, wherein the data access request is an update request, and if the requesting node has a copy of the identified data stored in cache, and wherein if one or more other nodes has a copy of the identified data stored in cache, the method further comprises:
sending an invalidate request to the other nodes that have a copy of the identified data stored in cache.

6. The method of claim 1, wherein the data access request is an update request, and if the requesting node has no copy of the identified data stored in cache, and wherein if one or more other nodes has a copy of the identified data stored in cache, the method further comprises:
sending a share-invalidate request to the node that last wrote the data; and
sending an invalidate request to the other nodes that have a copy of the identified data stored in cache.

7. The method of claim 1, further comprising:
determining whether another node has a directory lock on the data identified by the data access request;
if no node has a directory lock on the data, granting a directory lock on the identified data to the first access node; and
if a node has a directory lock on the data, waiting for the lock to be released before granting it to the first access node.

8. The method of claim 1, wherein an unowned directory entry is placed local to the first access node to access the corresponding data page, and wherein the first access node is given ownership of the directory entry.

9. The method of claim 1, wherein the data access request identifies one of a page of data, a sub-page of data, or multiple pages of data.

10. The method of claim 1, wherein the data access request is one of a data read request, a data write request and a data update request.

11. The method of claim 1, wherein the first access node maintains the portion of the directory as a table in memory, and wherein determining includes performing a lookup in the directory table.

12. The method of claim 1, further comprising:
placing a first copy of the set of cacheable memory pages in a local cache of the first data access node while a second copy of the set of cacheable memory pages resides in a local cache of a second data access node;
writing new data into the first copy of the set of cacheable memory pages in the local cache of the first data access node and concurrently inhibiting writing to the second copy of the set of cacheable memory pages in the local cache of the second data access node; and
after the new data is written into the first copy of the set of cacheable memory pages in the local cache of the first data access node, conveying the new data from the first data access node to the second copy of the set of cacheable memory pages in the local cache of the second data access node to directly share the new data with the second data access node prior to synchronizing the new data to a common storage resource externally coupled to the first and second data access nodes.

13. The method of claim 12 wherein a directory manager node manages a directory having page ownership entries corresponding to cacheable memory pages of the data storage network; and wherein writing the new data into the first copy of the set of cacheable memory pages in the local cache of the first data access node and concurrently inhibiting writing to the second copy of the set of cacheable memory pages in the local cache of the second data access node includes:
providing ownership of a particular page ownership entry to the first data access node and not to the second data access node, the particular page ownership entry corresponding to the set of cacheable memory pages, and
storing the new data into the first copy of the set of cacheable memory pages in the local cache of the first data access node in response to ownership of the particular page ownership entry being provided to the first data access node.

14. The method of claim 13, further comprising:
after conveying the new data from the first data access node to the second copy of the set of cacheable memory pages in the local cache of the second data access node, transferring ownership of the particular page ownership entry of the directory from the first data access node to the second data access node to enable the second data access node to write to the second copy of the set of cacheable memory pages in the local cache of the second data access node.

15. The method of claim 1 wherein determining whether the first access node has the identified data stored in cache, and if not: determining, using the directory whether another node in the plurality of access nodes has a copy of the identified data stored in cache includes:
identifying a second data access node as having a copy of the identified data stored in cache based on performance of a directory look-up in a manner which reduces network traffic among the plurality of access nodes.

16. The method of claim 15 wherein the data access request is a read request;
wherein determining whether the first access node has the identified data stored in cache, and if not: determining, using the directory whether another node in the plurality of access nodes has a copy of the identified data stored in cache further includes: detecting, by the first data access node, a local cache miss in response to the read request; and wherein sending one of the share request or an invalidate request includes: sending the share request exclusively to the second data access node in a point-to-point manner in response to the local cache miss, the second data access node sending the identified data directly to the host system and bypassing the first data access node in response to the share request, to reduce network traffic among the plurality of access nodes.

17. The method of claim 15 wherein the data access request is a write request;

wherein determining whether the first access node has the identified data stored in cache, and if not: determining, using the directory whether another node in the plurality of access nodes has a copy of the identified data stored in cache further includes: detecting that the host system is a sole owner of the data in response to the write request; and wherein sending one of the share request or an invalidate request includes: sending, in response to detection that the host system is the sole owner of the data, the invalidate request exclusively to the second data access node in a point-to-point manner to invalidate the copy of the identified data stored in cache at the second data access node and reduce network traffic among the plurality of access nodes.

18. The method of claim 1, wherein the share request and invalidate request are outgoing requests, and further comprising:

receiving incoming share requests and incoming invalidate requests from the other access nodes with respect to locally cached data of the shared data, the locally cached data being stored in the cache of the first access node;

in response to each received incoming invalidate request, invalidating the locally cached data; and in response to each received incoming share request, sending a copy of the locally cached data to another of the access nodes identified in the share request.

19. Apparatus for use as a first access node of a distributed set of caching data access nodes sharing access to shared data of a data storage volume, comprising:

a cache;

interface circuitry providing connections to (a) a host computer, (b) a storage device on which the shared data is stored, and (c) other access nodes of the distributed set of caching data access nodes; and a processor operative to execute instructions causing the apparatus to:

maintain at least a portion of a directory storing locations of copies of the shared data among respective caches of the access nodes;

receive a data access request from the host system identifying data of the shared data to be processed, determine whether the identified data is stored in the cache of the first access node, and if not, to:
(a) determine, using the portion of the directory, whether another of the access nodes has a copy of the identified data stored in its cache;
(b) if another of the access nodes does not have a copy of the identified data in its cache, then satisfy the data access request by obtaining the data from the storage device; and
(c) if another of the access nodes has a copy of the identified data stored in its cache, then send one of a share request to that node to share the identified data so that the first access node does not have to access the identified data from the storage device or an invalidate request to invalidate the copy of the data stored in that node's cache, wherein the one of a share request or the invalidate request is used to provide cache coherence between the caches; and if the identified data is stored in the cache of the first access node, then to (d) satisfy the data access request using the identified data in the cache of the first access node, and (e) if the data access is a read request, refrain from sending the share request to any of the other access nodes having a copy of the identified data as indicated by the portion of the directory, wherein the directory is divided into chunks associated with corresponding sets of pages of the shared memory, and the portion of the directory includes a chunk having a directory entry storing the locations of copies of the identified data among the caches of the access nodes, and wherein the instructions further cause the apparatus to participate in locality-conscious directory migration by which the chunks of the directory are dynamically distributed among the access nodes, the participating including:

prior to the satisfying of the data access request, obtaining ownership of the chunk so as to enable the first access node to use the portion of the directory to determine whether another of the access nodes has a copy of the identified data, the obtaining including:
(i) sending a directory query message to one of the access nodes functioning as a global directory chunk coordinator responsible for tracking and granting ownership of the chunks of the directory, the directory query message identifying the chunk;
(ii) receiving a directory reply message from the global directory chunk coordinator identifying a current owner of the chunk; and
(iii) communicating with the identified current owner of the chunk to obtain the ownership of the chunk; and after the satisfying of the data access request, transferring ownership of the chunk to another of the access nodes.

20. The apparatus of claim 19, wherein the plurality of access nodes comprises a requester node, a directory node, and a sharerthatdies node, the directory node being the first access node, and wherein the instructions further cause the apparatus to participate in the following operations performed in a failed reading of data to the requester node:

receiving at the directory node a read request message from the requestor node;

identifying, by the directory node, the sharerthatdies node among the access nodes of the system;

sending from the directory node to the sharerthatdies node a share request message;

determining by the directory node that the requester did not receive data from the sharerthatdies node; and sending from the directory node to the requester node a read failed message;

wherein the messages are adapted to maintaining fault tolerance in the system.

21. The apparatus of claim 19, wherein the plurality of nodes comprises a requester node, a directory node, and a pageowner node, the directory node being the first access node, and wherein the instructions further cause the apparatus to participate in the following operations performed in writing data from the requester node to the requester node cache:

receiving at the directory node a write request message from the requestor node;

determining by the directory node the pageowner node having a copy of the data;

sending from the directory node to the pageowner node an invalidate request message indicating the copy is invalid;

receiving from the pageowner node at the directory node a message in response to the invalidate request message; and sending from the directory node to the requester node a message in response to the write request message;

wherein the messages are adapted to maintaining cache coherency between the data nodes after a writing of data to the requester node cache.

22. A computer program product comprising a non-transitory storage medium having computer instructions recorded thereon, the computer instructions being operative when executed by a computerized device to cause the computerized device to perform a method of providing cache coherence between caches in a distributed set of caching data access nodes sharing access to shared data of a data storage volume, the method including:

maintaining at least a portion of a directory storing locations of copies of the shared data among respective caches of the access nodes;

receiving a data access request from the host system identifying data of the shared data to be processed, determining whether the identified data is stored in the cache of the first access node, and if not:

(a) determining, using the portion of the directory, whether another of the access nodes has a copy of the identified data stored in its cache;

(b) if another of the access nodes does not have a copy of the identified data in its cache, then satisfying the data access request by obtaining the data from the storage device; and (c) if another of the access nodes has a copy of the identified data stored in its cache, then sending one of a share request to that node to share the identified data so that the first access node does not have to access the identified data from the storage device or an invalidate request to invalidate the copy of the data stored in that node's cache, wherein the one of a share request or the invalidate request is used to provide cache coherence between the caches; and if the identified data is stored in the cache of the first access node, then (d) satisfying the data access request using the identified data in the cache of the first access node, and (e) if the data access is a read request, refraining from sending the share request to any of the other access nodes having a copy of the identified data as indicated by the portion of the directory, wherein the directory is divided into chunks associated with corresponding sets of pages of the shared memory, and the portion of the directory includes a chunk having a directory entry storing the locations of copies of the identified data among the caches of the access nodes, and wherein the instructions further cause the computerized device to participate in locality-conscious directory migration by which the chunks of the directory are dynamically distributed among the access nodes, the participating including:

prior to the satisfying of the data access request, obtaining ownership of the chunk so as to enable the first access node to use the portion of the directory to determine whether another of the access nodes has a copy of the identified data, the obtaining including:

(i) sending a directory query message to one of the access nodes functioning as a global directory chunk coordinator responsible for tracking and granting ownership of the chunks of the directory, the directory query message identifying the chunk;

(ii) receiving a directory reply message from the global directory chunk coordinator identifying a current owner of the chunk; and (iii) communicating with the identified current owner of the chunk to obtain the ownership of the chunk; and after the satisfying of the data access request, transferring ownership of the chunk to another of the access nodes.

* * * * *